US010032521B2

(12) United States Patent
Grigoriev et al.

(10) Patent No.: US 10,032,521 B2
(45) Date of Patent: Jul. 24, 2018

(54) PUF VALUE GENERATION USING AN ANTI-FUSE MEMORY ARRAY

(71) Applicant: Synopsys, Inc., Mountain View, CA (US)

(72) Inventors: Grigori Grigoriev, Ottawa (CA); Roman Gavrilov, Ottawa (CA); Oleg Ivanov, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/395,149

(22) Filed: Dec. 30, 2016

(65) Prior Publication Data

US 2017/0200508 A1    Jul. 13, 2017

Related U.S. Application Data

(60) Provisional application No. 62/276,458, filed on Jan. 8, 2016.

(51) Int. Cl.
*G11C 17/18* (2006.01)
*G11C 17/16* (2006.01)
*H04L 9/32* (2006.01)

(52) U.S. Cl.
CPC .............. *G11C 17/18* (2013.01); *G11C 17/16* (2013.01); *H04L 9/3228* (2013.01); *H04L 9/3278* (2013.01)

(58) Field of Classification Search
CPC ......... G11C 17/18; G11C 17/16; G11C 16/22; G11C 29/785; G11C 7/24; G11C 5/063;
(Continued)

(56) References Cited

U.S. PATENT DOCUMENTS 5,276,653 A * 1/1994 McKenny ............... G11C 17/16
327/525
6,836,000 B1 * 12/2004 Marr ................... H01L 23/5252
257/E23.147
(Continued)

FOREIGN PATENT DOCUMENTS

CA           2682092 C    11/2010
CN         103336930 A    10/2013
(Continued)

OTHER PUBLICATIONS

Tehranipoor et al., "DRAM based Intrinsic Physical Unclonable Functions for System Level Security", May 20-22, 2015, ACM, pp. 15-20.*
(Continued)

Primary Examiner — Matthew Smithers
(74) Attorney, Agent, or Firm — Fenwick & West LLP

(57) ABSTRACT

A method and system are used to generate random values for Physical Unclonable Function (PUF) for use in cryptographic applications. A PUF value generation apparatus comprises two dielectric breakdown based anti-fuses and at least one current limiting circuit connected between anti-fuses and power rails. Two anti-fuses are connected in parallel for value generation in programming by applying high voltage to both anti-fuses at the same time. Time for dielectric breakdown under high voltage stress is of random nature and therefore unique for each anti-fuse cell. Therefore the random time to breakdown causes one cell to break before another, causing high breakdown current through the broken cell. Once high breakdown current through one broken or programmed cell is established, a voltage drop across a current limiting circuit leads to decreased voltage across both cells, thereby slowing the time dependent break-
(Continued)

down process in the second cell and preventing it from breakage under programming conditions.

20 Claims, 14 Drawing Sheets

(58) Field of Classification Search
CPC ..... H04L 9/3228; H04L 9/3278; G06F 21/73; G06F 12/1408; G06F 2212/1052; G06F 2212/402; H01L 27/11206
See application file for complete search history.

(56) References Cited

U.S. PATENT DOCUMENTS

| | | | |
|---|---|---|---|
| 6,972,985 B2 | 12/2005 | Rinerson et al. | |
| 7,026,217 B1 | 4/2006 | Kamath et al. | |
| 7,173,855 B2* | 2/2007 | Porter | G11C 17/18 |
| | | | 257/E23.147 |
| 7,402,855 B2 | 7/2008 | Kurjanowicz | |
| 7,755,162 B2 | 7/2010 | Kurjanowicz et al. | |
| 8,300,450 B2* | 10/2012 | Christensen | G11C 11/4091 |
| | | | 365/102 |
| 8,699,256 B2 | 4/2014 | Kubouchi et al. | |
| 8,854,866 B2 | 10/2014 | Huber et al. | |
| 8,868,923 B1 | 10/2014 | Hamlet et al. | |
| 8,941,405 B2 | 1/2015 | Chi et al. | |
| 8,971,527 B2 | 3/2015 | Brightsky et al. | |
| 9,075,675 B2 | 7/2015 | Liu et al. | |
| 9,083,323 B2 | 7/2015 | Guo et al. | |
| 9,093,128 B2 | 7/2015 | Otterstedt et al. | |
| 9,189,654 B2* | 11/2015 | Feng | G06F 21/71 |
| 9,350,330 B2* | 5/2016 | Simons | G06F 7/588 |
| 9,613,714 B1* | 4/2017 | Wong | G11C 17/16 |
| 2002/0114188 A1* | 8/2002 | Lee | G11C 16/10 |
| | | | 365/185.18 |
| 2006/0291316 A1* | 12/2006 | Jenne | G11C 17/16 |
| | | | 365/225.7 |
| 2008/0094913 A1* | 4/2008 | Fasoli | G11C 16/12 |
| | | | 365/185.23 |
| 2009/0086521 A1 | 4/2009 | Herner et al. | |
| 2009/0262566 A1* | 10/2009 | Kurjanowicz | G11C 17/10 |
| | | | 365/96 |
| 2010/0110791 A1* | 5/2010 | Tailliet | G11C 16/0425 |
| | | | 365/185.09 |
| 2010/0165699 A1 | 7/2010 | Chen et al. | |
| 2012/0183135 A1 | 7/2012 | Paral et al. | |
| 2014/0022855 A1* | 1/2014 | Jang | G11C 17/16 |
| | | | 365/189.07 |
| 2014/0225639 A1 | 8/2014 | Guo et al. | |
| 2014/0268994 A1 | 9/2014 | Rose et al. | |
| 2015/0070979 A1* | 3/2015 | Zhu | G09C 1/00 |
| | | | 365/158 |
| 2015/0074433 A1 | 3/2015 | Zhu et al. | |
| 2015/0236698 A1* | 8/2015 | Pedersen | H03K 19/00384 |
| | | | 326/8 |
| 2017/0048072 A1* | 2/2017 | Cambou | H04L 9/3278 |
| 2017/0222817 A1* | 8/2017 | Wong | H04L 9/3247 |

FOREIGN PATENT DOCUMENTS

| | | |
|---|---|---|
| CN | 103902929 A | 7/2014 |
| CN | 104283549 A | 1/2015 |
| CN | 104579631 A | 4/2015 |
| WO | 2015027070 A1 | 2/2015 |

OTHER PUBLICATIONS

International Patent Application No. PCT/CA2016/051552, International Search Report and written opinion dated Mar. 6, 2017.
Liu, "Automatic Tuning of Digital Circuits," Electrical Engineering, University of Michigan, Dissertations and Theses (Ph.D. and Master's), Sep. 15, 2011, 113 pages.
Liu et al., "A True Random Number Generator Using Time-Dependent Dielectric Breakdown," Symposium on VLSI Circuits Digest of Technical Papers, Jun. 2011, pp. 216-217.
Liu et al., "OxID: On-Chip One-Time Random ID Generation Using Oxide Breakdown", Symposium on VLSI Circuits/Technical Digest of Technical Papers, Jun. 2010, pp. 231-232.
Protecting Next-Generation Smart Card ICs with SRAM-Based PUFs, PUF—Physical Unclonable Functions from NXP, Feb. 2013, 8 pages.
Canadian Office Action, Canadian Application No. 2,952,941, dated Aug. 16, 2017, 4 pages.

* cited by examiner

| Mode | Cell | WL[0] | WL[1] | COL_A[0] | COL_A[1] | COL_B[0] | COL_B[1] | COL_B[2] |
|---|---|---|---|---|---|---|---|---|
| Normal PUF mode | | | | | | | | |
| PUF Write | 1 & 2 | VPGM | VSS | 1 | 1 | 1 | 0 | 0 |
| PUF Read-Verify | 1 & 2 | Vread | VSS | 1 | 1 | 1 | 0 | 0 |
| PUF Read | 1 (or 2) | Vread | VSS | 1 (or 0) | 0 (or 1) | 1 | 0 | 0 |
| | | | | | | | | |
| Redundant PUF mode | | | | | | | | |
| PUF Write | 1 & 3 | VPGM | VPGM | 1 | 0 | 1 | 0 | 0 |
| PUF Read-Verify | 1 & 3 | Vread | Vread | 1 | 0 | 1 | 0 | 0 |
| PUF Read | 1 (or 3) | Vread (or VSS) | VSS (or Vread) | 1 | 0 | 1 | 0 | 0 |
| | | | | | | | | |
| Differential PUF mode | | | | | | | | |
| PUF Write | 1 & 5 | VPGM | VSS | 1 | 0 | 1 | 1 | 0 |
| PUF Verify (Single ended) first read | 1 | Vread | VSS | 1 | 0 | 1 | 0 | 0 |
| PUF Verify (Single ended) second read | 5 | Vread | VSS | 1 | 0 | 0 | 0 | 1 |
| PUF Read (Single ended) | 1 (or 5) | Vread | VSS | 1 | 0 | 1 (or 0) | 0 | 0 (or 1) |

FIG. 8

| Parameter | Data programming | PUF programming |
|---|---|---|
| Number of Cells exposed in parallel | 1 | 2 |
| Program Voltage | 9.4V | 9.1V |
| Program Pulse | 100us | 5us |
| Max Number of Pulses | 16 | 1000 |
| Number of bits programmed with first pulse | >= 99% | <= 1% |
| Read-verify Voltage | 1.4V | 3.3V |
| Read-verify Pulse | 50ns | 500ns |

FIG. 12

PUF VALUE GENERATION USING AN ANTI-FUSE MEMORY ARRAY

CROSS REFERENCE TO RELATED APPLICATIONS

This application claims the benefit of U.S. Provisional Patent Application No. 62/276,458, filed on Jan. 8, 2016, which is hereby incorporated by reference.

FIELD

The present disclosure relates generally to Physical Unclonable Function (PUF). More particularly, the present disclosure relates to the generation of a random binary value using anti-fuse memory cells as a PUF.

BACKGROUND

A Physical Unclonable Function (PUF) is a hardware circuit which generates one or more codes according to physical random performances of hardware devices, and thus difficult if not impossible, to duplicate. PUFs are widely used in data security in the military and commercial applications, e.g., unmanned vehicles, cloud computing, etc. A PUF can be used in almost any application in which a random number is required. Such applications preferably require the codes to be random chip over chip such that even if an exact layout of the chip is reproduced by reverse engineering, the set of codes of the reproduced chip are different from the original chip. The set of values generated by one chip must be constant over time, voltage, temperature, etc.

SUMMARY

It is an object of the present disclosure to obviate or mitigate at least one disadvantage of previous PUF value generating systems.

In a first aspect, the present disclosure provides a Physical Unclonable Function (PUF) value generation system. The PUF value generation system includes a pair of dielectric breakdown-based anti-fuse memory cells and a current limiting circuit. Each of the pair of dielectric breakdown-based anti-fuse memory cells has first terminals electrically coupled to each other for receiving a first voltage and second terminals electrically coupled to each other for receiving a second voltage to enable programming of both anti-fuse memory cells at the same time. The current limiting circuit is configured to couple the first voltage to the first terminals while the second terminals are coupled to the second voltage during a programming operation. The current limiting circuit is configured to provide a voltage difference between the first voltage and the first terminals when a first anti-fuse memory cell of the pair of anti-fuse memory cells forms a conductive link during the programming operation to conduct current from the current limiting circuit to the second terminals, which then inhibits programming of a second anti-fuse memory cell of the pair of anti-fuse memory cells. According to one present embodiment, the first terminals are gate terminals of the anti-fuse memory cells, and the second terminals are diffusion contacts of the anti-fuse memory cells electrically coupled to each other. Furthermore, the first voltage is a programming voltage and the second voltage is VSS.

According to an aspect of the present embodiment, the current limiting circuit includes a transistor of a wordline driver circuit that couples the programming voltage to the gate terminals, and the voltage difference is a voltage drop of the gate terminals relative to the programming voltage. The current limiting circuit can further include a voltage generator for providing the programming voltage. Alternate to the current aspect, the current limiting circuit can include a voltage generator for providing the programming voltage to the gate terminals. Alternate to the present aspect, the current limiting circuit includes a transistor of a write driver circuit that couples VSS to the diffusion contacts, and the voltage difference is a voltage drop of the diffusion contacts relative to VSS.

According to another aspect of the present embodiment, the gate terminals are connected in parallel to a wordline driven by a wordline driver circuit, and the diffusion contacts are connected to respective bitlines. Column access circuitry is configured to selectively couple the bitlines to each other and to the current limiting circuit, and the current limiting circuit includes the wordline driver circuit. Alternate to the other aspect of the present embodiment, the gate terminals of the first anti-fuse memory cell and the second anti-fuse memory cell are connected to different wordline driver circuits activated at the same time, and the diffusion contacts are connected to a common bitline. Here, column access circuitry is configured to selectively couple the common bitline to the current limiting circuit.

In a second aspect, the present disclosure provides a method of Physical Unclonable Function (PUF) value generation. The method includes applying a first voltage to first terminals of a pair of anti-fuse memory cells that are electrically coupled to each other; applying a second voltage to second terminals of the pair of anti-fuse memory cells that are electrically coupled to each other, the first voltage and the second voltage being effective for programming an anti-fuse memory cell; forming a conductive link in a first anti-fuse memory cell of the pair of anti-fuse memory cells in response to the first voltage and the second voltage, to conduct current from the first terminals to the second terminals; and, changing a voltage level of the first terminals in response to the current conducted from the first terminals to the second terminals, that is effective for inhibiting programming a second anti-fuse memory cell of the pair of anti-fuse memory cells.

According to embodiments of the second aspect, the voltage level includes limiting current between the first voltage and the first terminals, limiting current includes providing a voltage drop of the first terminals relative to the first voltage, and applying the first voltage includes driving a wordline connected to the first terminals with the first voltage with a wordline driver, while a transistor of the wordline driver provides the voltage drop of the wordline relative to the first voltage. In these embodiments, applying the second voltage includes selectively coupling bitlines connected to the second terminals to the second voltage. Alternately, limiting current can include providing a voltage drop of the second voltage relative to the second terminals, and applying the first voltage includes driving bitlines connected to the first terminals with the first voltage with a write driver, while a transistor of the write driver provides the voltage drop of the first voltage relative to the bitlines.

In a third aspect, the present disclosure provides a Physical Unclonable Function (PUF) programming method. The method includes executing a programming operation on a predetermined number of pairs of anti-fuse memory cells until one anti-fuse memory cell of each pair is detected to have at least a minimal read current; reading one anti-fuse memory cell of each of the predetermined number of pairs of anti-fuse memory cells to obtain a PUF data word using a reference voltage selected for detecting the minimal current; and re-programming the PUF data word to obtain programmed anti-fuse memory cells having a read current greater than the minimal read current.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 8 shows a table with logic states and voltages for signals in the circuit schematic of FIG. 7, according to a present embodiment;

FIG. 12 shows a table with example parameters for normal data programming and PUF programming, according to a present embodiment;

DETAILED DESCRIPTION

A method and circuit are used to provision and reliably reproduce a random value for Physical Unclonable Function (PUF) for use in cryptographic applications. In an embodiment of the present invention, a circuit in PUF value generation apparatus comprises two dielectric breakdown based anti-fuses and at least one current limiting circuit connected between the anti-fuses and the power rails. Two anti-fuse memory cells are connected in parallel for value generation in a programming cycle by applying high voltage to both anti-fuses at the same time. One anti-fuse memory cell will randomly program first, thereby providing a random bit value.

Dielectric breakdown under high voltage stress is known to be a process of random nature which causes time to breakdown to be unique for each anti-fuse cell. Unique and random time to breakdown using a particular programming voltage causes one cell to break before another, results in different cells programming at different times. This randomness can be used advantageously for PUF random value generation when two anti-fuse memory cells are connected in parallel with each other and subjected to concurrent programming, according to the present embodiments. Once high breakdown current through one broken cell is established, it causes a voltage differential across the current limiting circuit, which leads to decreased voltage across both cells. Due to the steep voltage dependence of breakdown time, the decreased voltage slows down the time dependent breakdown process in the second cell, and thus prevents it from breakage within the programming stress time window. The programming stress time window is a time period in which the programming voltage is applied to form a conductive link. This method allows for random breakage of one cell in pair while inhibiting another cell from being broken. Two cells, one of which is broken and another is intact, can be reliably and repeatedly read with conventional single ended read circuitry.

Following are descriptions of example anti-fuse memory cells which can be used in the PUF value generating system disclosed in the following embodiments.

Figure 1:
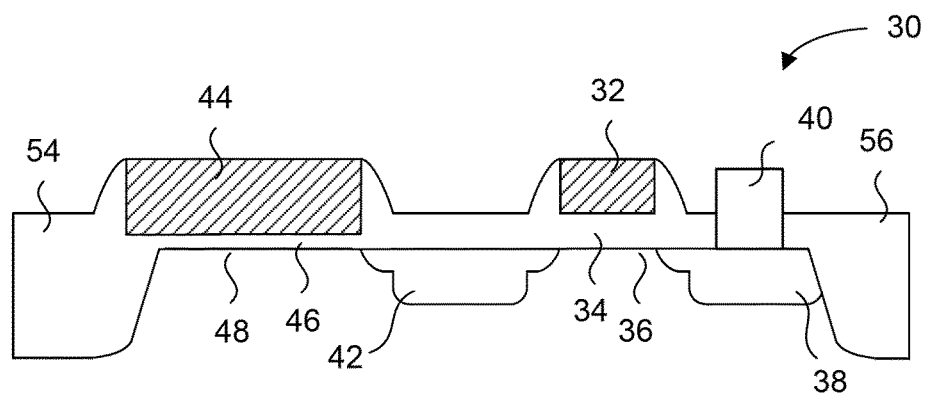
FIG. 1 is a cross sectional diagram of a two-transistor anti-fuse memory cell.

FIG. 1 is a cross sectional diagram of a two-transistor anti-fuse memory cell. This two-transistor anti-fuse memory cell 30 consists of an access transistor in series with an anti-fuse device. The access transistor, or access device, includes a gate 32 overlying a thick gate oxide 34, which itself is formed over the channel 36. On the right side of the channel 36 is a diffusion region 38 electrically connected to a bitline contact 40. On the left side of the channel 36 is a common diffusion region 42 shared with the anti-fuse device. The anti-fuse device includes a gate 44 overlying a thin gate oxide 46, which itself is formed over the channel 48. The thick gate oxide 34 can correspond to that used for high voltage transistors while the thin gate oxide 46 can correspond to that used for low voltage transistors. Gates 32 and 44 can be independently controlled, or alternatively can be connected to each other. For example, gate 32 can be coupled to a wordline while gate 44 can be coupled to a controlled cell plate voltage (VCP). Both diffusion regions 38 and 42 can have LDD regions, which can be identically doped or differently doped, depending on the desired operating voltages to be used. Thick field oxide, or shallow trench isolation (STI) oxide 54 and 56 are formed for isolating the memory cell from other memory cells and/or core circuitry transistors. Commonly owned U.S. U.S. Pat. No. 7,755,162 describes alternate two-transistor anti-fuse memory cells which can be used in a non-volatile memory array. The thin gate oxide 46 is intended to breakdown in the presence of a large electrical field during a programming operation, thereby creating an electrically conductive connection between channel 48 and gate 44. This electrically conductive connection can be referred to as a conductive link or anti-fuse.

A driving factor for reducing cost of any memory is the memory array area. The two-transistor anti-fuse memory cell 30 of FIG. 1 is a relatively large memory cell when compared to single transistor memory cells, such as flash memory cells for example. A single transistor anti-fuse memory cell is described in commonly owned U.S. Pat. No. 7,402,855.

Figure 2:
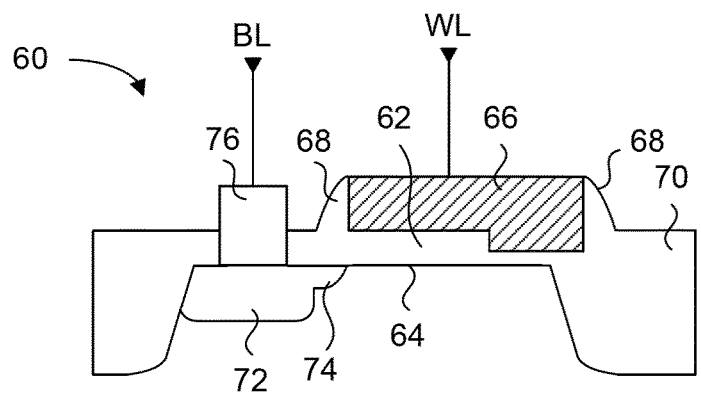
FIG. 2 is a cross-sectional view of a single transistor anti-fuse memory cell.

FIG. 2 is a cross-sectional view of the single transistor anti-fuse memory cell disclosed in commonly owned U.S. Pat. No. 7,402,855. Anti-fuse device 60 includes a variable thickness gate oxide 62 formed on the substrate channel region 64, a gate 66, sidewall spacers 68, a field oxide region 70 a diffusion region 72, and an LDD region 74 in the diffusion region 72. A diffusion contact 76, also known as a bitline contact when implemented in a memory array, is shown to be in electrical contact with diffusion region 72. The variable thickness gate oxide 62 consists of a thick gate oxide and a thin gate oxide such that a portion of the channel length is covered by the thick gate oxide and the remaining portion of the channel length is covered by the thin gate oxide. From this point forward, the thin gate oxide portion corresponds to the anti-fuse device portion of the single transistor anti-fuse memory cell while the thick gate oxide portion corresponds to the access transistor or device portion of the single transistor anti-fuse memory cell. Generally, the thin gate oxide is a region where oxide breakdown can occur. The thick gate oxide edge meeting diffusion region 72 on the other hand, defines an access edge where gate oxide breakdown is prevented and current between the gate 66 and diffusion region 72 is to flow for a programmed anti-fuse device.

In the presently shown example, the diffusion region 72 is connected to a bitline through a bitline contact 76, or other line for sensing a current from the gate 66, and can be doped to accommodate programming voltages or currents. This diffusion region 72 is formed proximate to the thick oxide portion of the variable thickness gate oxide 62. If the starting substrate is P type, then diffusion region 72 is doped to be N type material. To program anti-fuse memory cell 60, a high voltage level such as a programming voltage is applied on the wordline WL and the bitline is coupled to a low voltage level, such as VSS. The high electric field between the channel region 64 and the gate 66 should be sufficient to create a conductive link in the thin gate oxide to electrically connect the gate 66 to channel region 64. This is considered a programmed anti-fuse memory cell in the present description. This same principle applies to the anti-fuse memory cell 30 shown in FIG. 1, except that the conductive link is formed in the thin gate oxide 46 to couple the gate 44 to the channel 48. The dopant types can be reversed in both types of anti-fuse cells, and accordingly the applied voltage is would also be reversed as those skilled in the art would readily understand.

Figure 3:
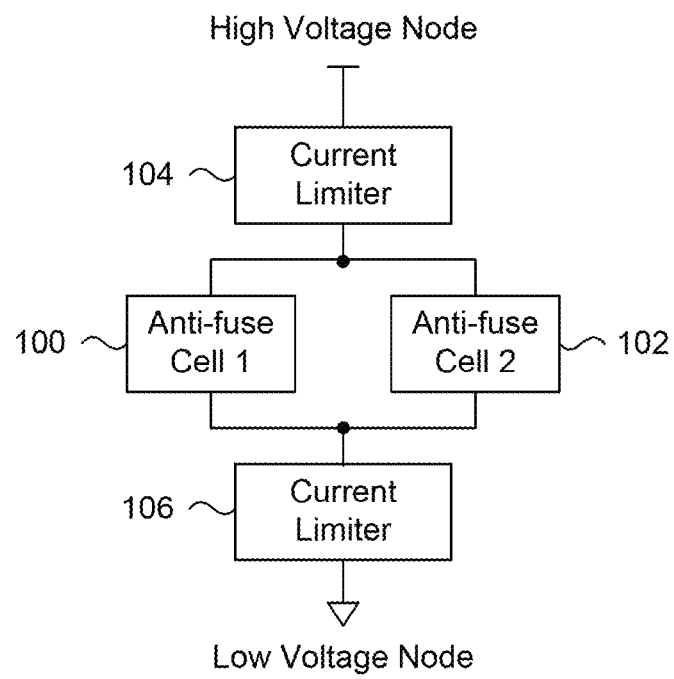
FIG. 3 is a block diagram of a single bit PUF value generation system, according to a present embodiment.

The presently described embodiments convert a combination of two random variables, which are the times to dielectric breakdown in two anti-fuse devices, into a single random bit variable. The embodiments of the present invention utilizes the fact that one anti-fuse in a pair of anti-fuse devices breaks first due to the random nature of breakdown time process. FIG. 3 is a block diagram showing a general circuit arrangement of a single bit PUF value generation system according to a present embodiment.

In the PUF programming system embodiment of FIG. 3, a pair of parallel anti-fuse memory cells 100 and 102 are connected between a high voltage node and a low voltage node via a first current limiter 104 and a second current limiter 106 respectively. Two anti-fuse devices are coupled to each other in parallel with the first and second current limiters 104 and 106. A high voltage provided by the high voltage node is applied to the gate terminals of the pair of anti-fuse devices. A VSS voltage provided by the low voltage node enables programming of the anti-fuse devices in the presence of the applied high voltage. In the present embodiments, a high voltage refers to a programming voltage relative to the VSS voltage which can generate an electric field of sufficient intensity to cause a break in the thin oxide region of the anti-fuse device. The parallel arrangement for cells allows for automatic reduction in stress for both cells as soon as one of them breaks randomly in time. A break in the context of the present anti-fuse devices refers to the formation of a conductive link between the gate and the underlying channel. Reduced stress makes it highly unlikely for second cell to break within a fixed program stress time window. According to the present embodiments, just one of the first current limiter 104 and the second current limiter 106 can be used for reduction of this programming stress upon the anti-fuse memory cell which has not been programmed. When the programming operation has ended, the result will be either anti-fuse cell 100 being programmed or anti-fuse cell 102 being programmed.

Figure 4:
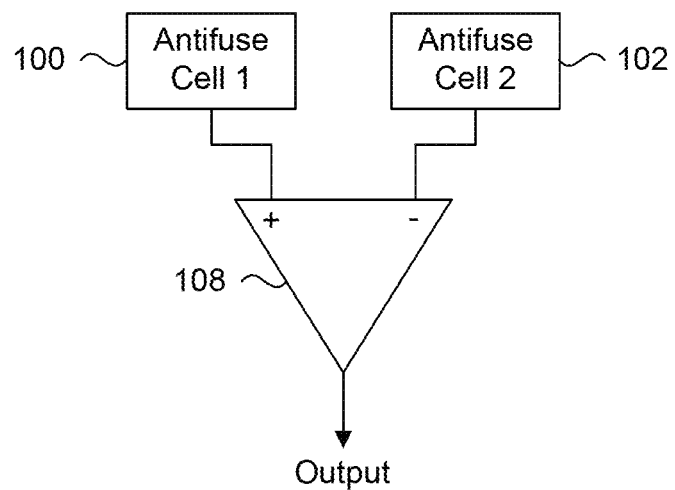
FIG. 4 is a block diagram of a read circuit for reading two cells per bit data.

As described in more detail later, a memory array having pairs of anti-fuse cells such as cells 100 and 102 in FIG. 3 where one of the cells is randomly programmed, can be configured to read out the randomly programmed data. This is conceptually shown in FIG. 4 where the pair of cells 100 and 102 are coupled to "+" and "−" inputs of a differential sense amplifier 108. Although both cells 100 and 102 can be coupled to the inputs of differential sense amplifier 108 as shown in FIG. 4, single ended reading is used. This means that only one of cells 100 and 102 is relied upon for reading out of the random data. The configuration in a circuit to read either cell 100 or 102 is a design choice. Depending on which of cells 100 and 102 is read, the output of sense amplifier 108 will either represent logic "1" or "0" states. In the present example, sense amplifier 108 is configured to provide a single ended output.

In an alternate embodiment, once the data state of either cell 100 or 102 is read and known, the complement data can be programmed to a third cell in order to store the data in a two cells per bit configuration. In such a configuration the differential sense amplifier 108 reads the complementary data from cell 100 or 102 and the third cell, and can be configured to provide differential outputs in order to minimize any power signature during read operations. As those of skill in the art would understand, differential sensing provides improved read margin relative to single ended sensing.

Figure 5A:
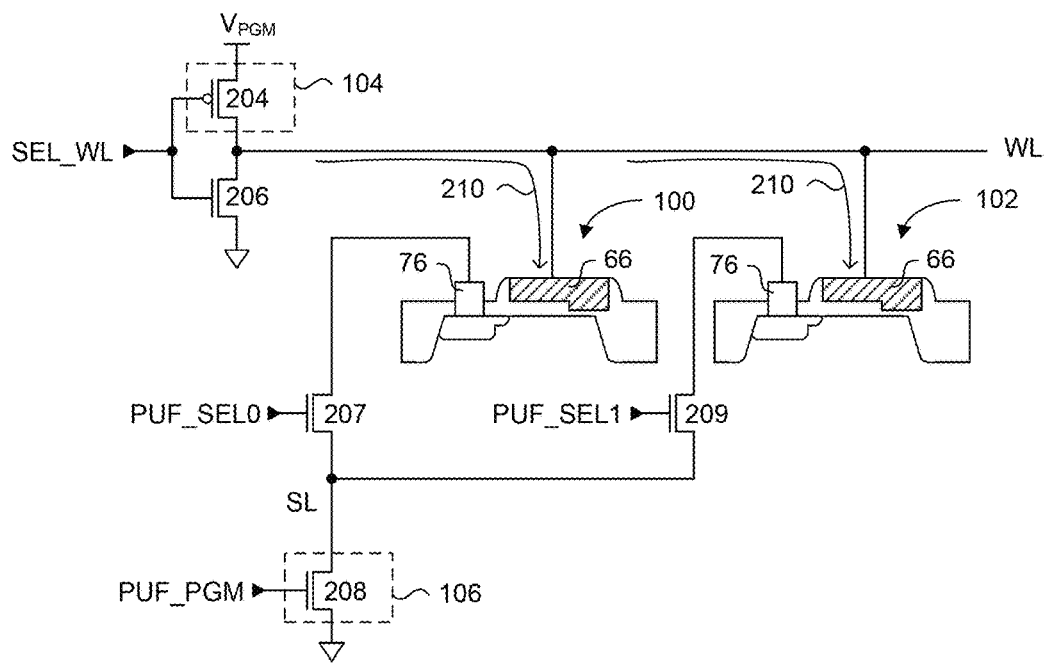
FIG. 5A is a diagram of a PUF data programming system, according to a present embodiment.

FIG. 5A shows an example of the PUF programming system shown in FIG. 3, and the following description provides an explanation of how the system self inhibits programming of a second anti-fuse memory cell after a first cell has randomly programmed. In the example of FIG. 5A, two anti-fuse memory cells 100 and 102 having the same structure as shown in FIG. 2 are electrically connected to each other and coupled to a wordline driver and a write driver. The gate of cells 100 and 102 are both connected in parallel to a wordline WL. The gate of the cells and transistors described in the present application can be made of polysilicon, metal or any other electrically conductive material. The wordline WL is driven by a wordline driver circuit consisting of a P-channel transistor 204 and an N-channel transistor 206 connected in series between a high voltage node and a low voltage node. In this example, transistor 204 functions as the current limiter 104 shown in FIG. 3. A selection signal SEL_WL at the low logic level selects the driver to apply a positive voltage level of the high voltage node to WL. This positive voltage level can be a read voltage level during a read operation, and can have a higher programming voltage level ($V_{PGM}$) during a programming operation. In this example, the low voltage node is VSS.

The bitline contacts 76 of both cells 100 and 102 are selectively coupled to a source line SL via respective N-channel transistors 207 and 209, to an N-channel transistor 208 functioning as the second current limiter 106 shown in FIG. 3. N-channel transistors 207 and 209 are controlled by signals PUF_SEL0 and PUF_SEL1 respectively, which can be driven to the high logic level at the same time to electrically couple diffusion contacts 76 of both cells 100 and 102 to each other. The gate terminal of—channel transistor 208 receives a signal PUF_PGM at the high logic level to couple the bitline contacts 76 to VSS.

Figure 5B:
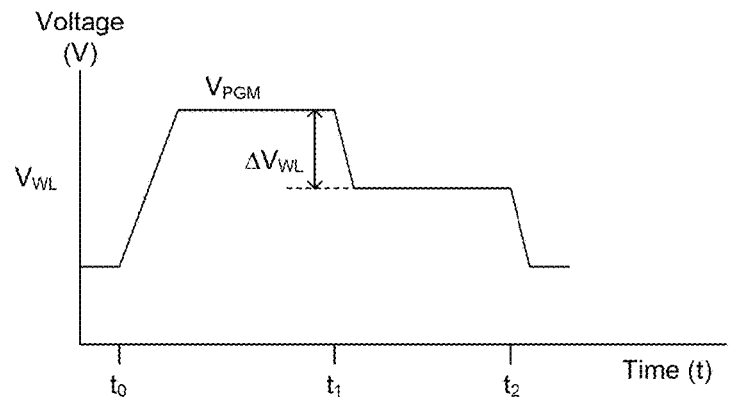
FIG. 5B is a timing diagram showing example wordline voltages during PUF data programming, according to a present embodiment.

The PUF programming operation is now described for the system shown in FIG. 5A, with reference to the timing diagram shown in FIG. 5B. The system shown in FIG. 5A is not necessarily part of a memory array, and can be implemented as a standalone circuit in any semiconductor device. Multiple instances of cells 100, 102 and of current limiter 106 can be fabricated for each wordline WL, where each pair of cells 100 and 102 generates a single random bit value. Each pair of cells 100 and 102 of each instance can have their gate terminals connected to WL, and each pair can be selected for PUF programming by selectively coupling the bitline contacts 76 of both cells to each other and selectively activating a respective PUF_PGM signal for that pair of cells.

Both PUF_SEL0 and PUF_SEL1 are set to the high logic level. Then, signal PUF_PGM is set to the high logic level to turn on N-channel transistor 208 at time $t_0$. The above mentioned sequence can be reversed or done at approximately the same time. Then SEL_WL is driven to the low logic level to turn on P-channel transistor 204, and the programming voltage $V_{PGM}$ on the high voltage node is applied to the wordline WL. Initially a current 210 will apply charge to the gates 66 of the cells 100 and 102 until the gates have reached the $V_{PGM}$ voltage level. With the wordline at $V_{PGM}$ and the bitline contacts 76 coupled to VSS, anti-fuse cells 100 and 102 are now under the proper programming conditions to form a conductive link in the thin gate oxide region of the cells.

Figure 5C:
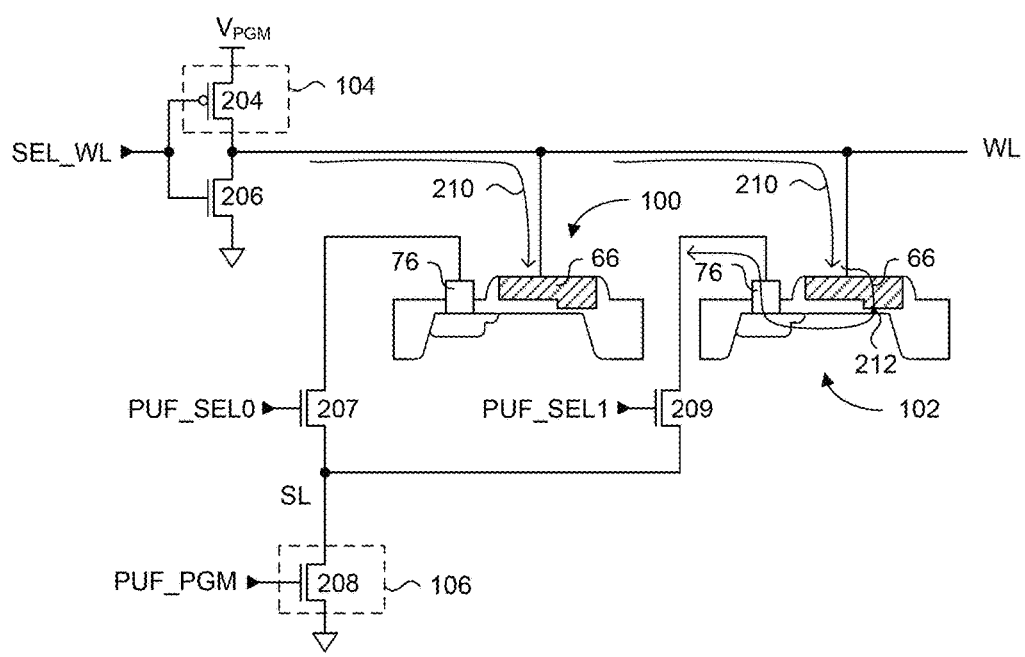
FIG. 5C is a diagram of a PUF data programming system after random programming of one memory cell, according to a present embodiment.

After a random amount of time $t_1$ passes, one of the two cells 100 and 102 will form a conductive link between the gate 66 and the channel of the cell in response to the electrical field stress. This is shown in FIG. 5C where cell 102 has formed a conductive link 212. Current can now travel from the gate 66 to bitline contact 76 of cell 102. Because transistor 208 is turned on, the wordline WL is now coupled to VSS. Shortly after time $t_1$, the word line voltage will drop because transistor 204 is sized to limit the amount of current it can conduct when a path to VSS is provided by the series connection of a programmed anti-fuse cell and transistor 208. As shown in FIG. 5B, the word line voltage $V_{WL}$ drops by an amount referred to as $\Delta V_{WL}$. Accordingly, there is a voltage difference across the source and drain terminals of transistor 204 that appears. This reduction in the word line voltage will result in a corresponding decrease in the electrical field across unprogrammed cell 100, thereby slowing the time dependent breakdown process in the second cell 100 and preventing it from breakage and formation of a conductive link between its gate 66 and its channel region.

Eventually at a preset time $t_2$, the programming operation ends by de-asserting the wordline. In this example, the wordline is driven to VSS at the end of the programming operation. This time can be simulated, modelled or tested to be a worst-case time for programming an anti-fuse memory cell based on the process used to fabricate it, voltages to be applied during programming, or any other factor which may have an impact on the amount of time required to program the anti-fuse memory cell. If the preset time is insufficient for random programming of either cell to occur, then the process can be iteratively repeated with intervening read verify operations to check if random programming of either cell has successfully occurred.

In this embodiment, current limiter 104 is configured to ensure that a voltage drop sufficient to prevent formation of a conductive link in the unprogrammed cell 100 occurs when the other cell 102 randomly programs. The current through a programmed anti-fuse memory cell and transistor 208 can be simulated, modeled or tested. Therefore, parameters such as peaking transistor 204, transistor sizing of device 204, taken in conjunction with the voltage level of VPGM and the voltage of SEL_WL can be adjusted using accurate modeling/simulation tools to arrive at a configuration that limits the current therethrough sufficiently to provide the desired voltage drop across transistor 204.

In the described technique above, one cell out of a pair of cells will be programmed and another remains un-programmed when the programming routine ends. Which cell gets broken is truly random because of the random nature of oxide breakdown, which therefore allows generation of a single random bit value.

In the above-described embodiment, while transistor 208 is present and fully turned on, it does not function as a current limiter. In other words, it is assumed that transistor 208 has been sized to sink all current provided by transistor 204 via a programmed anti-fuse cell. According to an alternate embodiment, transistor 204 is not configured as a current limiter, while transistor 208 is configured as a current limiter. In this alternate embodiment, transistor 208 is sized to sink less current than provided by a programmed anti-fuse memory cell. The programming operation for this alternate embodiment is now discussed with reference to the timing diagram of FIG. 5D, which shows the signal traces for the wordline ($V_{WL}$) and the source line ($V_{SL}$), and to the diagrams of FIGS. 5A and 5C.

As for the previously described embodiment, transistor 208 is turned on to couple SL to VSS at time $t_0$, and the wordline WL is driven to the $V_{PGM}$ voltage level by transistor 204. The current 210 is initially established until the gates 66 reach the $V_{PGM}$ voltage level. At some random time $t_1$, a conductive link 212 is formed in cell 102, and the wordline of WL is now coupled to current limiter 106. Although transistor 208 is fully turned on, because it is sized to sink less current than is provided by programmed cell 102, the voltage at the drain terminal of transistor 208 will rise after time $t_1$. The increase in $V_{SL}$ from the VSS voltage level is referred to as $\Delta V_{SL}$, and will reduce the electrical field strength across unprogrammed cell 100. This has the effect of slowing the time dependent breakdown process in the second cell 100 and preventing it from breakage and formation of a conductive link between its gate 66 and its channel region. Eventually at time $t_2$, the programming operation ends. Once again, because of the voltage difference across the current limiter 106, programming of the unprogrammed cell 100 is inhibited during the programming window of $t_0$-$t_2$.

Similar to the previous embodiment where transistor 204 is configured to limit current, transistor 208 can be configured to ensure that a voltage drop occurs across it when one of the anti-fuse memory cells forms a conductive link.

In the example embodiment shown in FIGS. 5A, 5B and 5C, one wordline driver is connected to one pair of anti-fuse memory cells. In an alternate configuration, two wordline drivers can be concurrently activated to program one of a pair of anti-fuse memory cells in a similar manner as described above. This is discussed and shown in further detail with respect to the embodiment of FIG. 6.

Figure 5D:
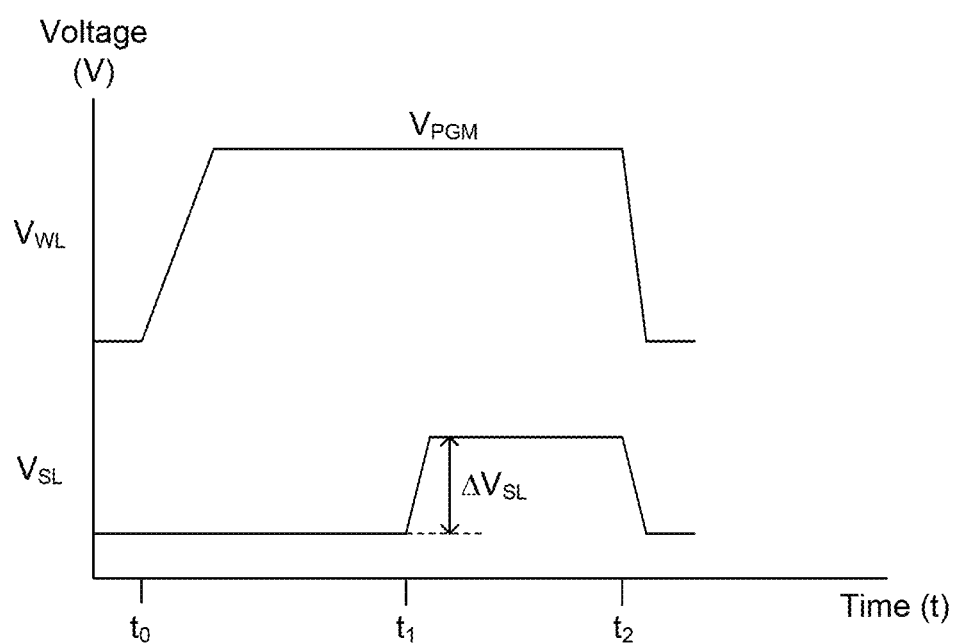
FIG. 5D is a timing diagram showing example wordline and source line voltages during PUF data programming, according to a present embodiment.
Figure 6:
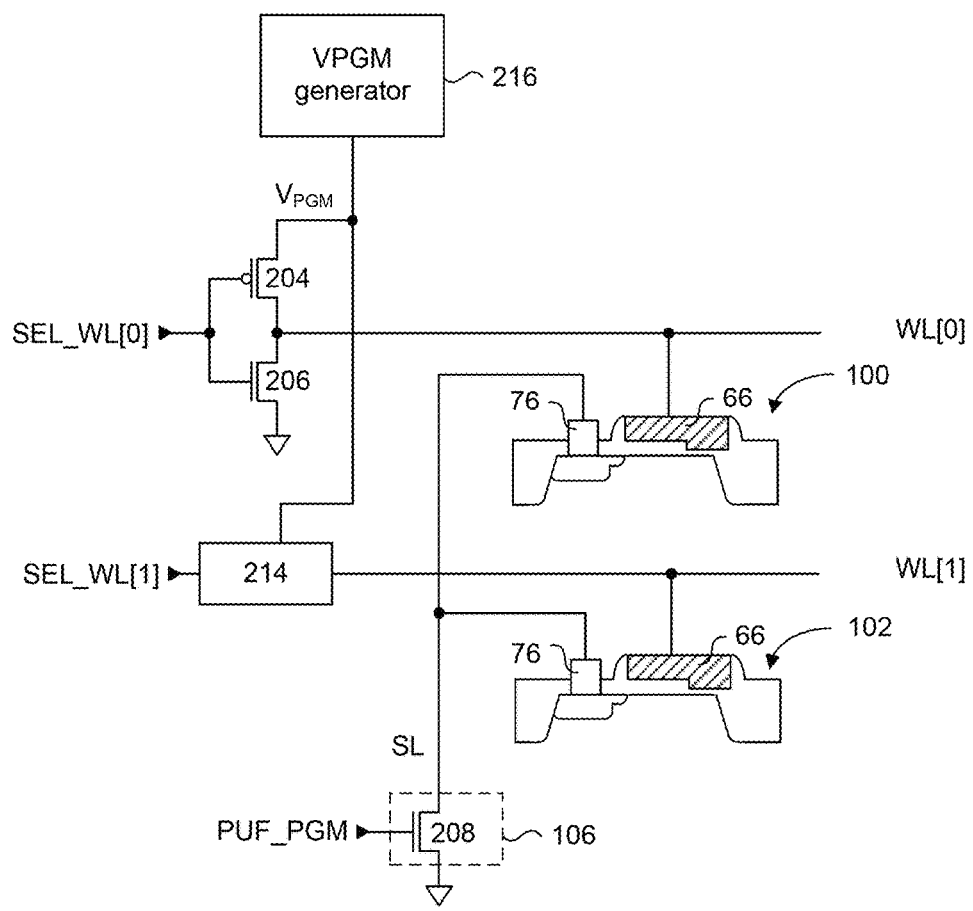
FIG. 6 is a diagram of a PUF data programming system, according to an alternate embodiment.

In the embodiment of FIG. 6, the same cells 100 and 102 are shown, except each is now connected to a respective wordline. Cell 100 is connected to WL[0] which is connected to a wordline driver consisting of previously described transistors 204 and 206. Cell 102 is connected to WL[1] which is connected to a wordline driver represented by box 214. Each wordline driver is controlled by respective signals SEL_WL[0] and SEL_WL[1]. A programming voltage generator (VPGM generator) 216 or switch circuit provides VPGM to the wordline drivers. Both cells 100 and 102 are connected to the same source line SL, which is coupled to VSS via current limiter 106. For random PUF data programming, both signals SEL_WL[0] and SEL_WL[1] are activated to drive WL[0] and WL[1] in parallel with the $V_{PGM}$ voltage, and PUF_PGM is set to turn on transistor 208. If transistor 208 is configured to act as the current limiter, then the voltage of the source line $V_{SL}$ will follow the same pattern as shown in FIG. 5D when one of the cells randomly programs, to inhibit programming of the other cell. Alternately, VPGM generator 216 can be configured to include a current limiter, such that upon random programming of one of cells 100 or 102, the voltage level of VPGM follows the same pattern as $V_{WL}$ of FIG. 5B, to inhibit programming of the other cell.

According to yet another alternate embodiment, both current limiters 104 and 106 can be active to inhibit programming of a second cell after a first cell has programmed. More specifically, the transistors of both current limiters 104 and 106 can be sized to ensure that there is a voltage drop of $V_{WL}$ of the wordline and an increase in $V_{SL}$ of the source line. It is noted that the series connection of transistor 204, one anti-fuse memory cell and transistor 208 can be configured as a voltage divider, where devices 204 and 208 can be engineered such that the WL node has a specific voltage level that is less than VPGM or the SL node has a specific voltage level that is greater than VSS. Persons of skill in the art should understand how to configure a voltage divider to achieve the desired voltage levels at the WL and the SL nodes.

The PUF programming system embodiments shown in FIGS. 5A, 5C and 6 can be implemented in a memory array that is used for normal data writing and reading. Accordingly, such an anti-fuse memory array can store user data and can generate random PUF data.

Figure 7:
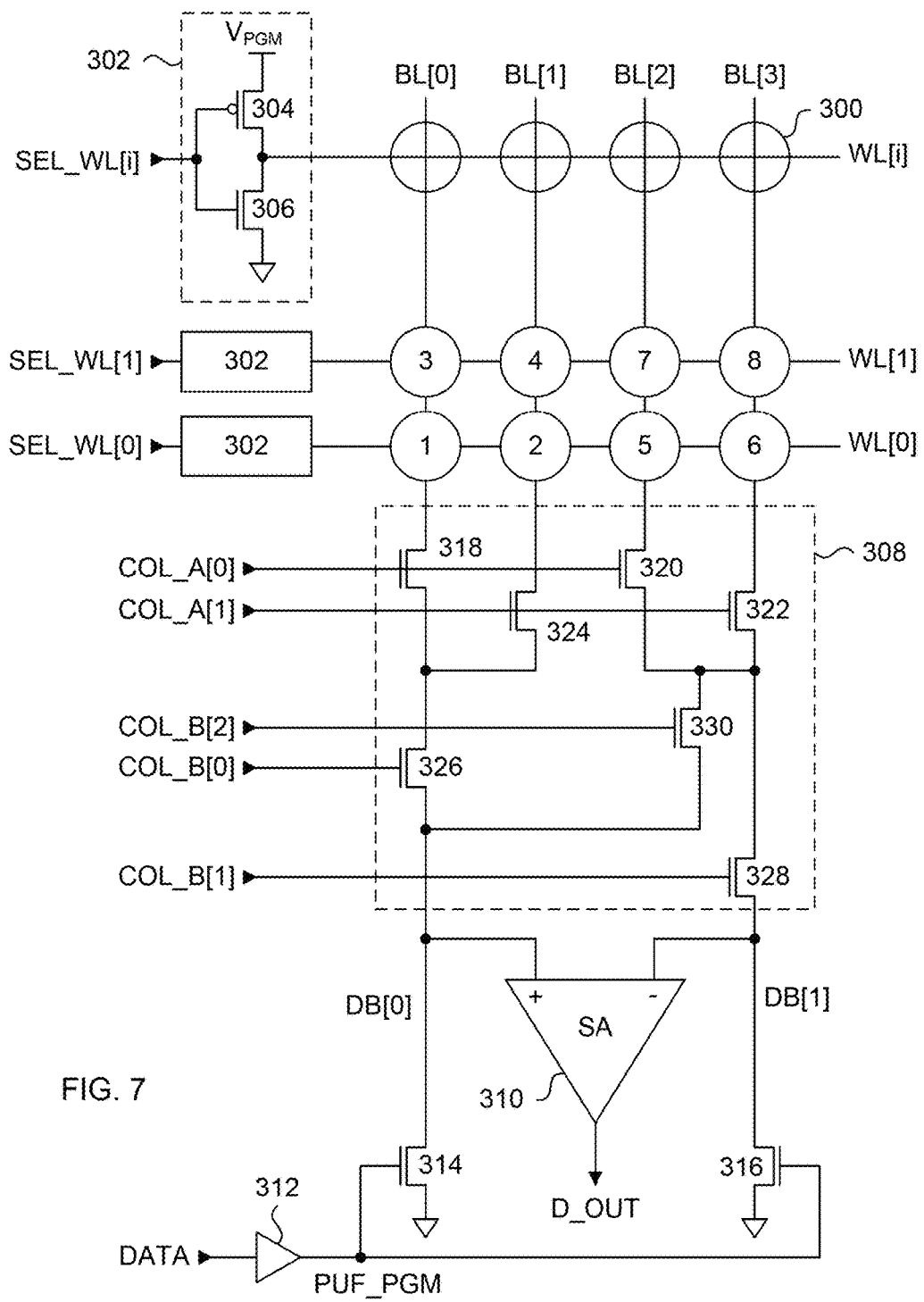
FIG. 7 is a circuit schematic of a portion of a memory array configured for PUF data programming, according to a present embodiment.

FIG. 7 is a circuit schematic showing a portion of a memory array with wordline drivers, column access circuits, a sense amplifier and write circuits. The memory array includes bitlines BL[0] to BL[3], wordlines WL[0] to WL[i], and anti-fuse memory cells 300 appearing as circles connected to cross points of the bitlines and the wordlines. In this example, there can be up to "i" wordlines, where "i" is an integer value. The anti-fuse memory cells 300 can be the ones shown in FIGS. 1 and 2 of the present application, or any other anti-fuse memory cell which can be programmed in the same manner. Each wordline is connected to a wordline driver 302, where each wordline driver 302 includes a complementary pair of CMOS transistors 304 and 306. Each wordline driver receives a respective selection signal SEL_WL[0] to SEL_WL[i] to activate it during read and program operations. Only one wordline is selected during any read and program operation. Each wordline driver is connected to a high voltage node and a low voltage node, where a variety of voltage generators can be provided to provide voltages of different levels to the wordline drivers. While not shown in FIG. 7, the high voltage node of the wordline drivers are connected to a VPGM generator, such as the one shown in FIG. 6.

The bitlines can be connected to precharge circuitry, which is not shown in FIG. 7. It is assumed that the bitlines are precharged and/or maintained at a voltage level that would inhibit programming of memory cells connected to it before programming commences. By example, the program inhibit voltage level can be a positive voltage level while a program enable voltage level can be VSS. Column access circuit 308 selectively couples bitlines to a pair of data buses DB[0] and DB[1]. A sense amplifier 310 has a "+" input and a "−" input connected to DB[0] and DB[1] respectively for sensing the voltage levels appearing thereon and to provide a corresponding data output D_OUT. Data buses DB[0] and DB[1] are further connected to a write circuit consisting of a write data buffer 312 that receives a bit of data information DATA, and write drivers 314 and 316. In this embodiment, the write drivers 314 and 316 are N-channel transistors connected to VSS In the context of PUF programming, this signal is referred to as PUF program enable signal PUF_PGM. Apart from the wordlines, the elements shown in FIG. 7 can be repeated in a larger memory array.

It is noted that the circuit schematics shown are graphical representations of many different specific semiconductor circuit designs which can provide the same desired result. For example, the wordline signals can be connected to cells via local wordlines, global wordlines etc.

Following is a further detailed discussion about the column access circuit 308. This circuit includes switching devices, shown as N-channel transistors 318, 320, 322, 324, 326, 328 and 330 controlled by column access signals. N-channel transistors 318, 320, 322 and 324 form a first stage column select circuit, where transistors 318 and 320 are controlled by the decoded COL_A[0] signal, while devices 322 and 324 are controlled by the decoded COL_A[1] signal. Signals COL_A[0] and COL_A[1] are derived from column address signals, as is well known in the art. Accordingly, the first stage column select circuit couples either bitlines BL[0] and BL[2] or BL[1] and BL[3] to the second stage column select circuit. The second stage column select circuit consists of transistors 326, 328 and 330 that receive decoded signals COL_B[0], COL_B[1] and COL_B[2] respectively. Similarly, signals COL_B[0], COL_B[1] and COL_B[2] are derived from a combination of a column address signals and other control signals, as is well known in the art. The switching devices of column access circuit 308 are controlled during normal data program operations to couple the write drivers 314 and 316 to selected bitlines, and during normal read operations to couple the selected bitlines to sense amplifier 310. More relevant to the present embodiments, these same switching devices of column access circuit 308 in conjunction with the row drivers 302, can be controlled to execute PUF data programming in one of three different modes. These are referred to as the Redundant PUF mode, the Normal PUF mode, and the Differential PUF mode. Regardless of which mode is used, two memory cells are subjected to programming at the same time. A description of how PUF programming is executed in the memory array configuration of FIG. 7 for each of these modes now follows.

In order to facilitate the following discussion of the three PUF programming modes, reference is made to FIG. 7 and FIG. 8. In FIG. 7, certain anti-fuse memory cells 300 are labelled with numerals 1, 2, 3, 4, 5, 6, 7 and 8. FIG. 8 shows a table listing the PUF Write, PUF read-verify operation and PUF read operation for each mode, the specific cell numbers being accessed, the voltage is applied by specific word lines, and the corresponding logic states of the column access signals appearing in FIG. 7 required to access the specified cells. It is assumed in this example that all other word lines are in FIG. 7 are unselected. In the present examples, a logic "1" means the transistor receiving that signal is turned on while a logic "0" means the transistor receiving that signal is turned off, VPGM is a programming voltage and VSS is 0V. Information appearing in parenthesis indicates the state or voltage for the alternative cell selection appearing in parenthesis.

In the Redundant PUF mode, two memory cells 300 connected to the same bit line and connected to separate wordline drivers 302 are subjected to programming at the same time. The configuration of these two memory cells 300 is similar in connection and function to the one shown in FIG. 6. This is referred to as a "redundant" mode because in normal operations of the memory device it is possible to program the same bit of data to two (or more) cells connected to the same bit line, and read both cells at the same time. This mode improves reliability and robustness of data storage. The table of FIG. 8 shows example logic states for the column access signals and voltage levels for the wordlines which results in selection of cells numbered 1 and 3 being subjected to the programming voltage and bit line BL[0] being coupled to VSS via transistors 318, 326 and 314. It is assumed that DATA is at the high logic state to turn on write driver 314. Persons skilled in the art will understand that different states of the column access signals can be used to select the cell pairings of 2 and 4, 5 and 7, and 6 and 8 for coupling to VSS either through write drivers 314 or 316. In one embodiment of the PUF write operation, the selected wordline drivers 302 are activated to apply the programming voltage on the selected word lines WL[0] and WL[1] for a specific duration of time, which has been simulated or modeled based on the fabrication process, cell structure and voltages to be sufficient for achieving random programming of one of the cells. This specific duration of time, also referred to as a pulse, should be shorter than the pulse used during normal data programming. While one of the cells may not programmed during the PUF programming pulse, the cumulative effect of multiple applied pulses should result in random programming of just one of the two cells.

Once the programming period has ended, a PUF read-verify operation is executed to check if at least one of the two cells has programmed. With reference to the table of FIG. 8, a single ended read operation is executed by driving both selected wordlines to the read voltage Vread which is less than the programming voltage of VPGM, and activating the same column access signals from the PUF write operation. Prior to activation of the wordlines, bit line BL[0] is precharged to VSS via the activated column access signals and by write driver 314 which is turned on by DATA. Accordingly, bit line BL[0] is now coupled to the "+" input of sense amplifier 310. While not shown in FIG. 7, the "−" input of sense amplifier 310 receives a reference voltage during the PUF read-verify operation. This reference voltage can be selected to be a level sufficient to detect the first sign of breakdown in the gate oxide of the anti-fuse device of a cell. This can be seen as a weak conductive link being formed in the anti-fuse device, and such a cell is referred to as a weak programmed cell.

Depending on the process, circuit design and voltage levels used, anti-fuse memory cells can form conductive links with varying levels of conductivity when programmed. Therefore anti-fuse memory cells with a lower level of conductivity are termed weak programmed cells while anti-fuse memory cells with a higher level of conductivity are termed as strong programmed cells, where the threshold between a weak and a strong programmed cell is determined by the desired read current which can be detected by a sense amplifier. Accordingly, different reference voltages can be used during normal program verify operations versus PUF program read-verify operations, as the desired result of PUF programming is to detect the first sign of breakdown or formation of a weak conductive link. This is typically exhibited as a weak read current, or a minimal current which is detectable using a sense amplifier and suitable reference voltage.

Because both cells 1 and 3 are connected to the same bit line BL[0], either cell having a conductive link formed therein will increase the voltage level of DB[0], which can be detected by sense amplifier 310. Successful detection of this increased voltage level is indication of successful PUF programming, and is reflected in the D_OUT signal of sense amplifier 310. D_OUT can be received by control logic that determines random programming of cells 1 and 3 is completed. Otherwise, this control logic repeats the above described PUF write operation and PUF read-verify operation until successful PUF programming is detected or a predetermined number of iterations have passed without successful PUF programming and the operation is deemed to have failed. In the event of a failed operation, the control logic can select an alternate pairing of cells for PUF programming.

The cycles of PUF write and PUF read-verify are executed for any predetermined number of cell pairs connected to word lines WL[0] and WL[1]. Eventually, all cell pairs will be determined as having one cell successfully programmed but it is not known which cell of the pair of cells has been programmed. This is the random nature of PUF value generation according to the present embodiments. In order to obtain a PUF word consisting of data from each pair of cells, a PUF read operation is executed using only the cells connected to one of the two word lines. As shown in the table of FIG. 8, the wordlines WL[0] and WL[1] are driven to the Vread voltage level and only one of switching devices 318 and 324 is activated in conjunction with activating switching device 326 in the present example. This operation is similar to the PUF read-verify operation. Accordingly, some of the cells will be detected as being programmed, while others will be detected as being unprogrammed as it is the other cell of the pair connected to the non-accessed wordline that was programmed.

Once the PUF word has been obtained, a normal data programming operation can be executed to program this PUF word to the same cells. As previously mentioned, PUF programming results in the formation of a weak conductive link in the anti-fuse device. The purpose of a normal data programming operation is to soak the PUF programmed cells, or strengthen the conductive link such that reading from a programmed cell results in a large margin relative to an unprogrammed cell. This will ensure reliable and accurate reading of the PUF word during normal operations of the memory device. Instead of reprogramming the PUF word to the same cells, the PUF word can be normally programmed to cells at a different address location.

According to an alternate embodiment, once the PUF word has been obtained and reprogrammed as described above, the PUF word can be inverted to its complement which is then programmed to another location in the memory array. This location can be selected for differential sensing of each PUF data bit against its corresponding complementary bit. By example, if cell 1 of FIG. 7 is the PUF data, its complement can be stored in cell 5. Then differential sensing is executed by setting COL_A[0], COL_B[0] and COL_B[1] to couple BL[0] and BL[2] to sense amplifier 310.

Following is a discussion of the Normal PUF mode. In the Normal PUF mode, two memory cells 300 connected to the same word line and connected to separate bit lines are subjected to programming at the same time. The configuration of these two memory cells 300 is similar in connection and function to the one shown in FIG. 5A. This is referred to as a "normal" mode, as a single word line is activated to enable programming and reading of a single memory cell during normal program and read operations of the memory device.

The table of FIG. 8 shows example logic states for the column access signals and voltage levels for the selected wordline which results in selection of cells numbered 1 and 2 being subjected to the programming voltage and bit lines BL[0] and BL[1] being coupled to VSS via transistors 318, 324, 326 and 314. It is assumed that DATA is at the high logic state to turn on write driver 314. Persons skilled in the art will understand that different states of the column access signals can be used to select the cell pairings of 3 and 4, 5 and 6, and 7 and 8 for coupling to VSS through write driver 314. Alternately, the column access signals can be configured to couple the cell pairings of 5 and 6, and 7 and 8 to VSS through write driver 316. In one embodiment of the PUF write operation, the selected wordline driver 302 is activated to apply the programming voltage on the selected word line WL[0] for a specific duration of time, which has been simulated or modeled based on the fabrication process, cell structure and voltages to be sufficient for achieving random programming of one of the cells.

Once the programming period has ended, a PUF read-verify operation is executed to check if at least one of the two cells has programmed. With reference to the table of FIG. 8, a single ended read operation is executed by driving the selected wordline to the read voltage Vread which is less than the programming voltage of VPGM, and activating the same column access signals from the PUF write operation. Prior to activation of the wordlines, bit lines BL[0] and BL[1] are precharged to VSS via the activated column access signals and by write driver 314 which is turned on by DATA. Accordingly, both bit lines BL[0] and BL[1] are now coupled to the "+" input of sense amplifier 310. While not shown in FIG. 7, the "−" input of sense amplifier 310 receives a reference voltage during the PUF read-verify operation. This reference voltage can be selected to be a level sufficient to detect the first sign of breakdown in the gate oxide of the anti-fuse device of a cell, as described for the previous Redundant PUF mode.

Because both cells 1 and 2 are coupled to DB[0], either cell having a conductive link formed therein will increase the voltage level of DB[0], which can be detected by sense amplifier 310. Successful detection of this increased voltage level is indication of successful PUF programming, and is reflected in the D_OUT signal of sense amplifier 310. As in the Redundant PUF mode, the PUF write operation and PUF read-verify operations are repeated until successful PUF programming is detected or a predetermined number of iterations have passed without successful PUF programming and the operation is deemed to have failed.

The cycles of PUF write and PUF read-verify are executed for any predetermined number of cell pairs connected to pairs of bit lines which can be selectively coupled to the same input of a sense amplifier, such as sense amplifier 310. Eventually, all cell pairs will be determined as having one cell successfully programmed but it is not known which cell of the pair of cells has been programmed. Once again, the random nature of PUF value generation according to the present embodiments is provided. In order to obtain a PUF word consisting of data from each pair of cells, a PUF read operation is executed using only the cells connected to one of the two bit lines. As shown in the table of FIG. 8, the wordline WL[0] is driven to the Vread voltage level and only one of switching devices 318 and 324 is activated in conjunction with activating switching device 326 in the present example. Accordingly, some of the cells will be detected as being programmed, while others will be detected as being unprogrammed as it is the other cell of the pair connected to the non-accessed bit line that was programmed.

Once the PUF word has been obtained, a normal data programming operation can be executed to program this PUF word to the same cells or to a different set of cells as previously described for the Redundant PUF mode. Similarly as previously described, the complement of the PUF word can be obtained and programmed to a location that facilitates differential sensing of each PUF data bit and its complement.

Following is a discussion of the Differential PUF mode. In the Differential PUF mode, two memory cells 300 connected to the same word line and connected to separate bit lines are subjected to programming at the same time, which is similar to the Normal PUF mode. The difference here is that each selected bitline (and its corresponding selected cell) are coupled to their own write drivers 314 and 316.

The table of FIG. 8 shows example logic states for the column access signals and voltage levels for the selected wordline which results in selection of cells numbered 1 and 5 being subjected to the programming voltage and bit lines BL[0] and BL[2] being coupled to VSS via transistors 318, 320, 326, 328, 314 and 316. It is assumed that DATA is at the high logic state to turn on write drivers 314 and 316. Persons skilled in the art will understand that different states of the column access signals can be used to select the cell pairings of 2 and 6, and 4 and 8 for coupling to VSS through write driver 314. In one embodiment of the PUF write operation, the selected wordline driver 302 is activated to apply the programming voltage on the selected word line WL[0] for a specific duration of time, which has been simulated or modeled based on the fabrication process, cell structure and voltages to be sufficient for achieving random programming of one of the cells.

Once the programming period has ended, a PUF read-verify operation is executed to check if at least one of the two cells has programmed. Unlike the previously described PUF read-verify operations where just a single cycle is required to determine if either of both cells is programmed, the present differential PUF mode requires separate read-verify cycles for each of the two cells that were subjected to programming. Prior to activation of the wordlines, bit lines BL[0] and BL[2] are precharged to VSS via the previously activated column access signals and by write drivers 314 and 316 which are turned on by DATA.

With reference to the table of FIG. 8, a first single ended read operation is executed by driving the selected wordline to the read voltage Vread which is less than the programming voltage of VPGM, and activating only column access signals COL_A[0] and COL_B[0]. Accordingly, bit line BL[0] is coupled to the "+" input of sense amplifier 310. While not shown in FIG. 7, the "−" input of sense amplifier 310 receives a reference voltage during the PUF read-verify operation. This reference voltage can be selected to be a level sufficient to detect the first sign of breakdown in the gate oxide of the anti-fuse device of a cell, as described for the previous Redundant PUF mode. The result of this first read-verify cycle can be stored in a register. The bit lines are precharged again, and a second single ended read operation is executed by driving the selected wordline to the read voltage Vread which is less than the programming voltage of VPGM, and activating only column access signals COL_A [0] and COL_B[2]. Accordingly, bit line BL[2] is coupled to the "+" input of sense amplifier 310, and this second sensed result is compared to the first sensed result. A simple XOR comparison resulting in a logic one indicates that just one of the two cells has been programmed. Any other result indicates either both cells have failed to program, or both cells have programmed.

As in the Redundant PUF mode, the PUF write operation and PUF read-verify operations are repeated until successful PUF programming is detected or a predetermined number of iterations have passed without successful PUF programming and the operation is deemed to have failed. In the event both cells have been programmed, the operation is deemed to have failed.

The cycles of PUF write and PUF read-verify are executed for any predetermined number of cell pairs connected to pairs of bit lines which can each be selectively coupled to both inputs of a sense amplifier, such as sense amplifier 310. Eventually, all cell pairs will be determined as having one cell successfully programmed. Once again, the random nature of PUF value generation according to the present embodiments is provided. In order to obtain a PUF word consisting of data from each pair of cells, a PUF read operation is executed using only the cells connected to one of the two bit lines. As shown in the table of FIG. 8, the wordline WL[0] is driven to the Vread voltage level and only one of switching devices 326 and 330 is activated in conjunction with activating switching devices 318 and 320 in the present example. Accordingly, some of the cells will be detected as being programmed, while others will be detected as being unprogrammed as it is the other cell of the pair connected to the non-accessed bit line that was programmed.

Once the PUF word has been obtained, a normal data programming operation can be executed to program this PUF word to the same cells or to a different set of cells as previously described for the Redundant PUF mode. Similarly as previously described, the complement of the PUF word can be obtained and programmed to a location that facilitates differential sensing of each PUF data bit and its complement.

As previously discussed for the embodiments of FIGS. 5A and 6, the write driver transistor, such as P-channel transistor 304, can be a first current limiter while the write driver transistor 314 can be a second current limiter, where either one or both can be configured to inhibit programming of a second anti-fuse memory cell within the programming time window when a first anti-fuse memory cell has programmed. Furthermore, while not shown in FIG. 7, the VPGM voltage generator or switch can also be configured to be a current limiter during PUF programming.

The previous discussion mentions PUF programming and normal programming of cells in the memory array of FIG. 7. It is noted that the objectives of PUF programming and normal programming differ. During normal data programming, programming time is optimized and marginally programmed cells (weakly programmed cells) are avoided. By example, this can be done by using longer programming pulses, higher programming voltages, and higher programming currents. During normal programming read-verify operations, higher reference voltages are used to identify the marginally programmed cells in order to further program them into strongly programmed cells. Ideally, a memory cell is programmed in a single programming operation, which includes a single programming pulse.

On the other hand, PUF programming optimizes parameters to maximize the probability of programming just one of a pair of parallel connected memory cells. As previously discussed, this can be done by limiting current in the pulldown and/or pull a path, with optional control of the voltages provided to the pull up and pulldown devices. With reference to the embodiment of FIG. 5A by example, VPGM can provide a reduced current during PUF programming, and the VSS connection of transistor 208 can be replaced with a controlled current source that sinks less current from the cells.

Figure 9:
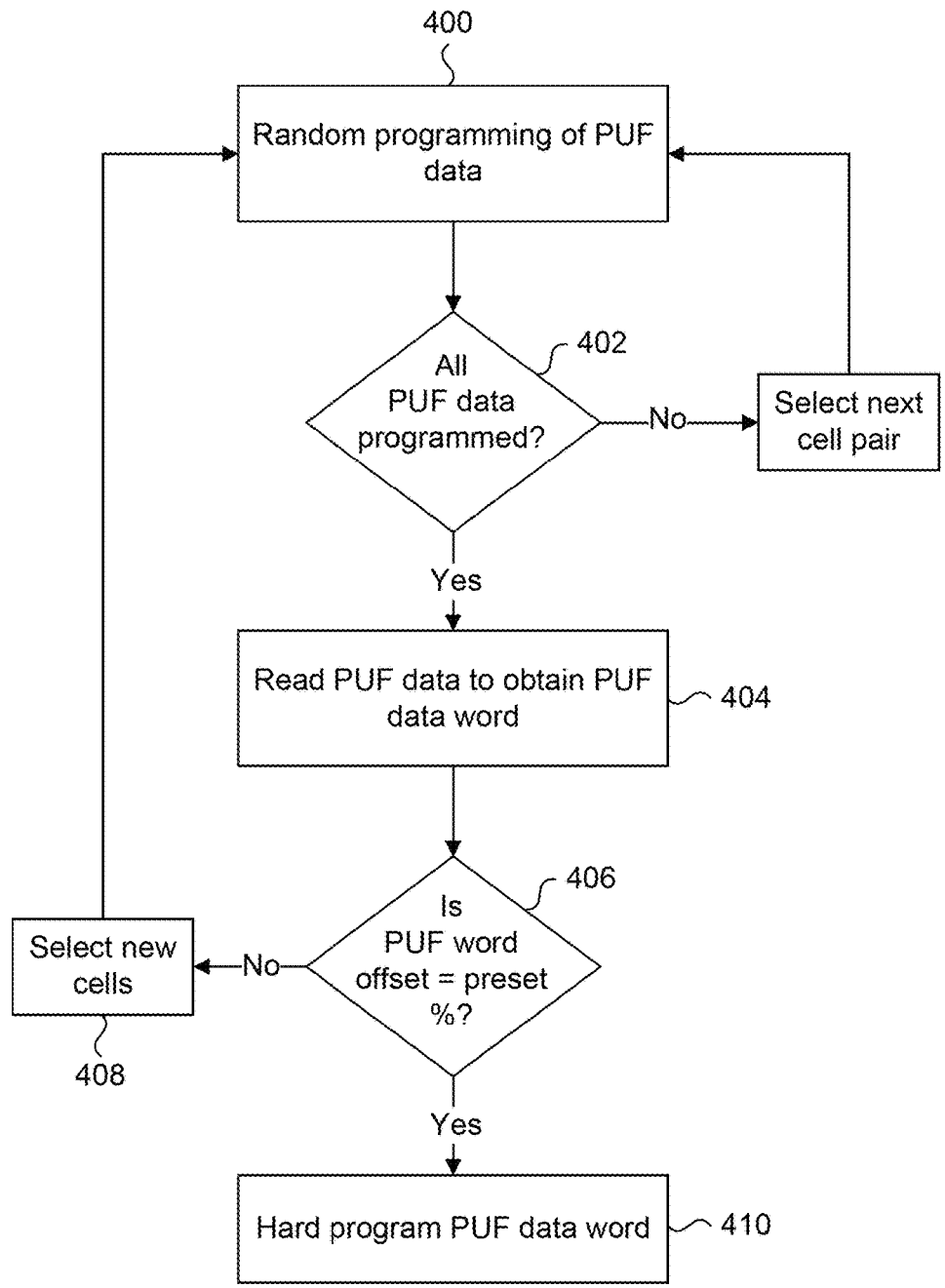
FIG. 9 is a flow chart of a method for PUF programming process, according to a present embodiment.

FIG. 9 is a flow chart summarizing the PUF programming process, common to the Redundant PUF mode, Normal PUF mode, and Differential PUF mode. It is assumed that the length of the PUF word has been set and a starting location for the cells to be subjected to PUF programming has been selected. The method starts at 400 where random programming of a pair of memory cells is executed, using any one of the previously described Redundant, Normal or Differential PUF modes. This step includes programming and read-verification of each of pair cells which make up a bit position of the PUF word. At 402, the system determines if all the PUF data positions have been programmed. If not, then the next cell pair is selected for programming at 400. Otherwise, all PUF data positions have been determined as having one cell of the pair programmed, and the PUF data word is read out at 404.

According to an optional embodiment of the present method, some applications may require a certain percentage of offset between randomly programmed logic 0 and 1 data of the PUF data word. For example, a predetermined offset can be 50% in which half the PUF data bits are logic 0 and the other half are logic 1. Onboard logic can count the bits and determined if the offset is 50%, or within a particular range of predetermined offset. For example, 50% to 60% of the data bits can be logic 0.

The PUF data word offset determination is made at 406, and if it does not match a predetermined offset or is not within a predetermined offset range, then the PUF programming process for the currently selected starting location is deemed as failed and a new location for starting over the PUF programming process is selected at 408. Then a new PUF programming process starts again at 400. Instead of selecting new cells at 408, the entire device can be deemed a failed part. Otherwise, the PUF data word offset matches and offset or is within a predetermined offset range, and the method proceeds to 410 for hard programming of the PUF data to the current cells or to new cells at a different location in the memory array. This hard programming uses normal programming voltages and currents that would be used during normal data programming operations of the memory device, resulting in programmed cells having a read current that is greater than the minimal read current from a PUF programmed cell.

Figure 10:
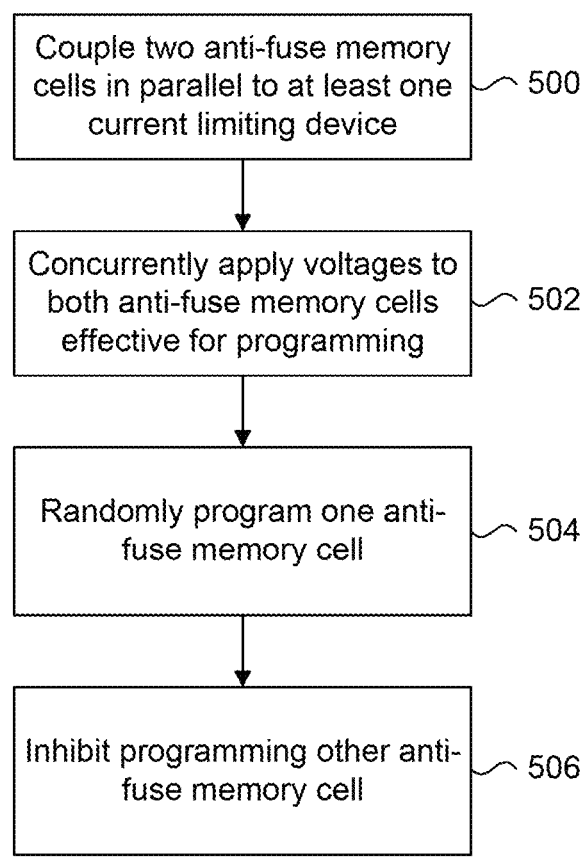
FIG. 10 is a flow chart of a method for PUF random data programming, according to a present embodiment.

FIG. 10 is a flow chart outlining a method for PUF programming which can be used as part of step 400 of FIG. 9, according to a present embodiment. The method begins at 500 by coupling two anti-fuse memory cells in parallel to at least one current limiting device. An example of this is shown in the embodiment of FIG. 5A where the anti-fuse memory cells 100 and 102 have gates 66 connected in parallel to current limiter 104, and have bitline contacts 76 connected in parallel to current limiter 106. Similarly, the memory array circuit schematic of FIG. 7 shows how two anti-fuse memory cells can be connected in parallel to a wordline driver 302 and a write driver 314. Following at 502, voltages are applied to both anti-fuse memory cells at the same time, which are conducive for programming the cells by formation of a conductive link in their gate oxides. At 504, one of the anti-fuse memory cells randomly programs and forms a conductive link in its gate oxide. An example of this is previously shown in FIG. 5C, where a conductive link 212 is formed in anti-fuse memory cell 102. Following at 506, the other anti-fuse memory cell is inhibited from being programmed. This can be done by the action of one or both of the current limiters which reduces the electrical field across the unprogrammed anti-fuse memory cell.

The previously described approach was tested using simultaneous stress for two cells in parallel in test mode for five arrays. The randomness and uniqueness of generated PUF values was evaluated with Hamming distances. The results show close to ideal randomness and uniqueness of codes for each of 5 arrays. The generated PUF value demonstrated stability over 50 read cycles, across different temperature conditions and read regimes.

The specific configuration of the switching devices shown in the embodiment of FIG. 7 is merely one example of a possible configuration and types of devices, logic gates and address signals which can be used to provide the aforementioned three PUF programming modes. According to the present embodiments, any configuration which allows for all three modes of operation to be executed can be used.

In the previously described embodiments, the PUF random data programming operation ends at a predetermined "worst case" time, as explained for the embodiment shown in FIGS. 5A, 5B and 5C. This worst case programming operation time is selected based on modelling or experimentation of anti-fuse memory cells which are the most difficult to program, and implemented by a state machine (not shown) or other control logic (not shown) of the memory device that controls timing and application of signals. Such cells would require a longer period of time to form a weak conductive link.

Figure 11:
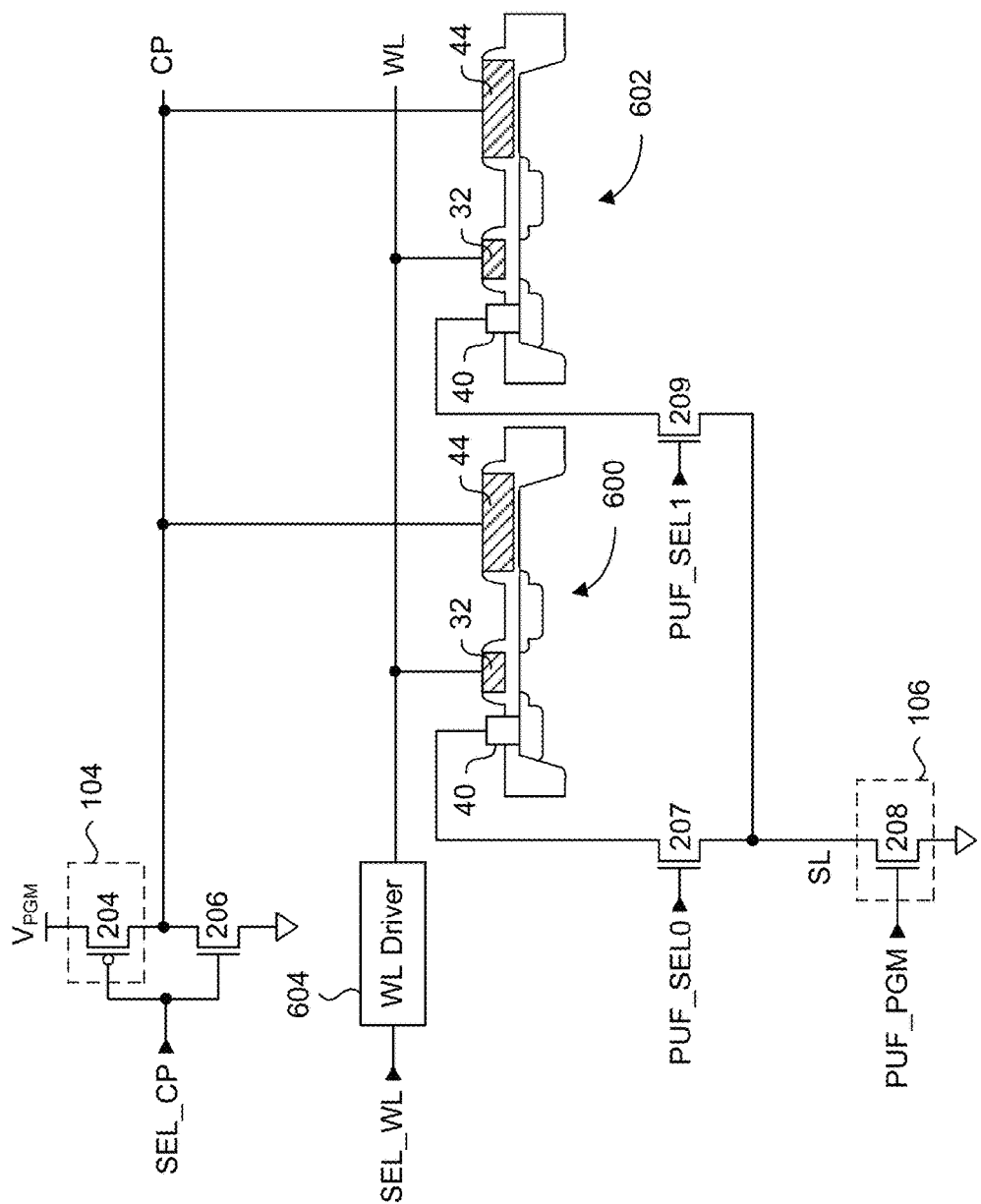
FIG. 11 is a diagram of a PUF data programming system, according to a present embodiment.

The previously described random PUF programming embodiments are shown using the single transistor anti-fuse memory cell of FIG. 2. The previously described PUF programming embodiments are applicable to any memory cell having an anti-fuse device independent of the number of transistors that make up the cell. By example, the two transistor anti-fuse memory cell of FIG. 1 can be used in place of the single transistor anti-fuse memory cell with equal effectiveness. FIG. 11 is a diagram of a PUF data programming system similar to FIG. 5A except that the anti-fuse memory cells 100 and 102 are replaced with 2 transistor anti-fuse memory cells 600 and 602. The same reference numbers appearing in previous figures designate the same elements which have been described already. The elements that differ between FIG. 11 and FIG. 5A are now described. The driver circuit consisting of transistors 204 and 206 now functions as a cell plate (CP) driver for applying a programming voltage $V_{PGM}$ to the gate 44 of cells 600 and 602, in response to cell plate selection signal SEL_CP. In this example, a separate wordline driver circuit 604 drives a wordline connected to gates 32 of cells 600 and 602, in response to wordline selection signal SEL_WL. The random PUF programming operation is exactly the same as previously described for the embodiment of FIG. 5A, except for the additional step of driving a selected wordline to electrically couple the bitline contact 42 to the channel underneath gate 44 for the duration of the programming operation. This wordline voltage should be sufficiently high to allow all current from a conductive link between the gate 44 and the underlying channel to pass through to bit line contact 40.

In the example embodiment shown in FIG. 11, one wordline driver and one cell plate driver are connected to one pair of anti-fuse memory cells. In an alternate configuration, two wordline drivers and two cell plate drivers can be concurrently activated to program one of a pair of two transistor anti-fuse memory cells in a similar manner as shown in the embodiment of FIG. 6. In such an embodiment, both memory cells 600 and 602 would be connected directly to the same bit line as shown in the embodiment of FIG. 6.

The proposed approach is stable over wide variety of parameters and with significant process variation because of large difference in conduction between broken and unbroken oxides (at least 3 orders of magnitude by example).

The present embodiments provide a high level of true randomness, better than other known techniques. The present embodiments provide high reliability over time and read cycles, and high repeatability of PUF value, better than other known techniques.

Figure 13:
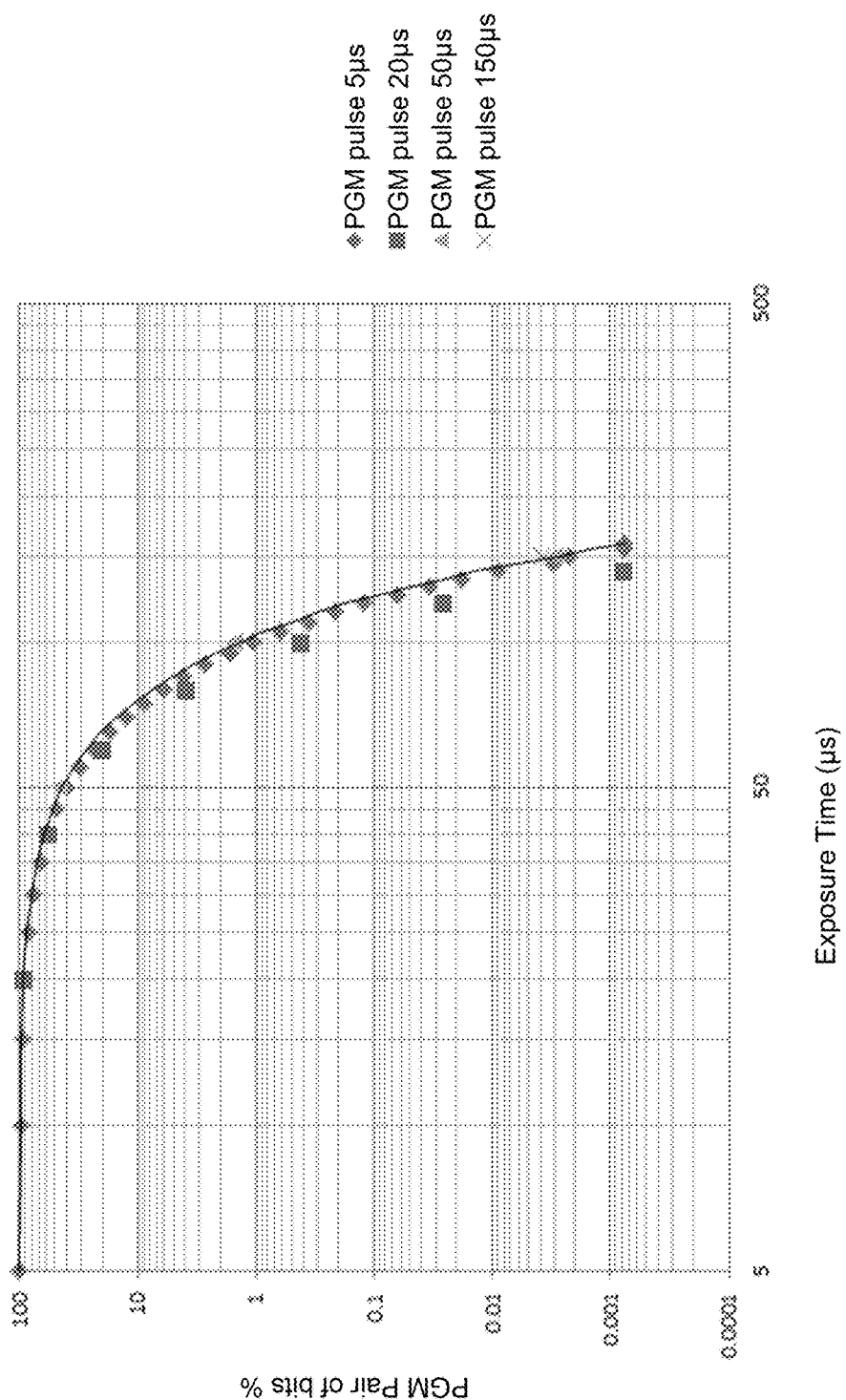
FIG. 13 is a graph showing OTP PUF programmability test results, according to a present embodiment.
Figure 14:
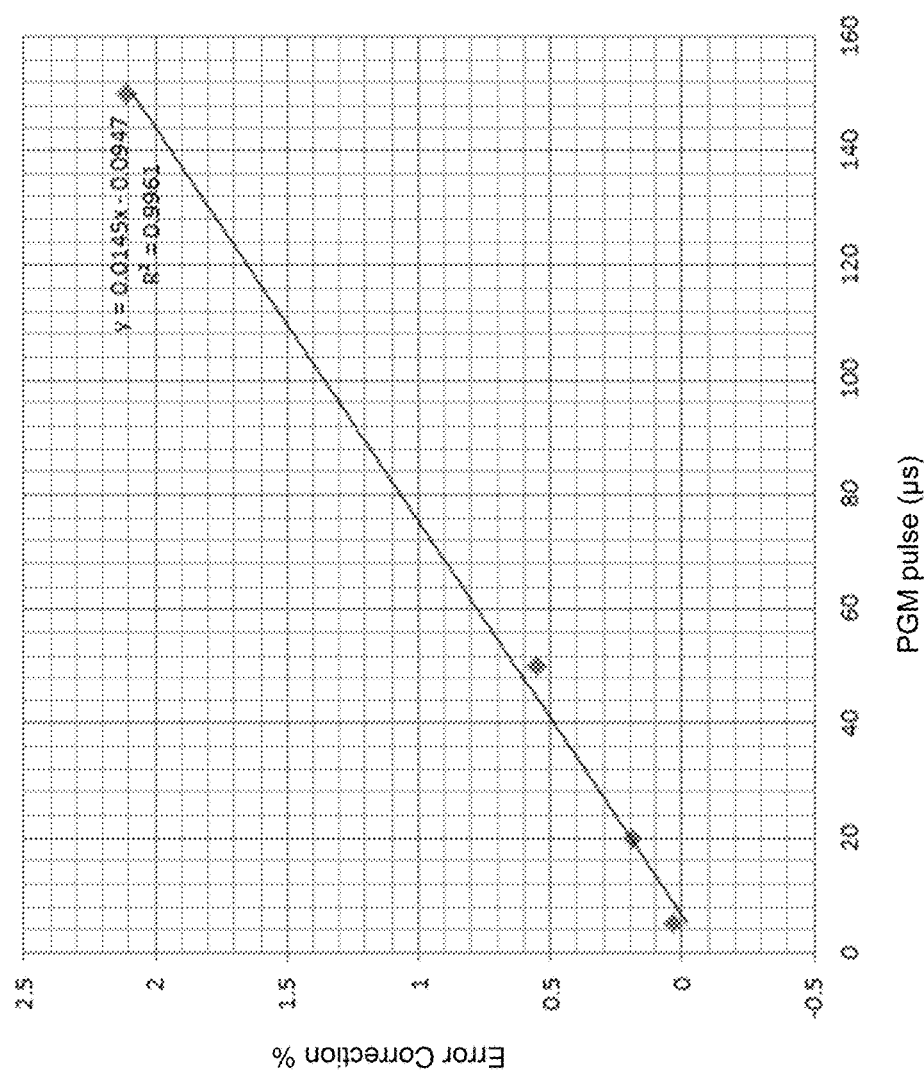
FIG. 14 is a graph showing OTP PUF error test results, according to a present embodiment.

An OTP memory device based on the previously described embodiments was fabricated using a 180BCD (180 nm bipolar-CMOS-DMOS) process offered by foundries such as TSMC by example. FIGS. 12, 13 and 14 shows example parameters and results of PUF programming. PUF programming was executed using the previously described Redundant PUF mode using a single current limiter coupled to the bit line. FIG. 12 shows a table with example parameters used for normal programming of OTP data and for the PUF programming. FIGS. 13 and 14 are graphs showing OTP PUF programmability test results and OTP PUF error test results respectively for the fabricated OTP memory device.

The table of FIG. 12 shows the programming voltage applied to the gates of the anti-fuse devices, pulse length, number of pulses, number of bits programmed with the first pulse, read verify voltage applied to the gates of the anti-fuse devices and read verify pulse length, during normal data programming and PUF programming. During normal data programming, the parameters are selected to maximize the probability of a cell being programmed after the first programming pulse. As previously discussed for PUF programming, some applications require 50% logical 0's and 1's across the entire set of bits that make up the PUF data word. This is achieved by having exactly one bit programmed in each pair of memory cells. In the present embodiments, this is done by reducing the programming voltage and the program pulse length relative to normal data programming as shown in FIG. 12, but applying the shorter programming pulse repetitively (with intervening read verify cycles to check for successful programming of one memory cell). In the present example, a minimum pulse length of 5 µs will ultimately result in 99.9% pairs of cells with a single bit being programmed. Typically, the PUF programming pulse length is 10 times to 100 times shorter than would be used for normal data programming.

The OTP PUF programmability test results graph of FIG. 13 shows the percentage of unprogrammed locations (two cells per location in this example) after each pulse for pulse lengths of 5 µs, 20 µs, 50 µs and 150 µs, over a cumulative exposure time. The graph shows that by using many short 5

μs pulses results in 99.9% pairs of cells with a single bit being programmed. Depending on the final application, using pulse lengths of 20 μs and 50 μs may provide satisfactory results if 50% logical 0's and 1's is not required.

The OTP PUF error test results graph of FIG. 14 shows the amount of error in PUF programming against programming pulse length. In this graph, error is defined as the percentage of two bits programmed per cell pair. It is clearly shown from the results in FIG. 14 that a 5 μs pulse results in error of <0.1%. Stated in the alternative, use of the 5 μs pulse results in 99.9% bit cell pairs having only one cell programmed. Use of pulses between 50 μs and 150 μs in duration results in 0.5% to 2.1% error, meaning that up to 2% of cell pairs have both cells programmed.

Returning to the table of FIG. 12, a brief discussion of the read verify voltage and pulse lengths for normal data programming and PUF programming now follows. During normal data programming, read verification is done using a minimum read voltage and a maximum reference voltage level (or minimum pulse width) to verify that a programmed cell has enough margin. On the other hand, PUF programming read verification intends to detect early signs of oxide breakdown in the anti-fuse device. In the present embodiments, this is done by increasing the read verify voltage to a maximum level by example, and using a minimum reference voltage level (or maximum pulse width).

Those skilled in the art will understand that anti-fuse memory cells fabricated using different processes from different foundries may result in the use of different programming voltages, read verify voltages and possibly in combination with different pulse lengths compared to those shown in the table of FIG. 12 in order to achieve similar results.

The presently described embodiments do not require a read operation, self-termination of stress for second anti-fuse. The presently described embodiments provide for high stability and reliability of generated PUF value over read cycles and read conditions, and there is minimal degradation of Hamming distance over time. Known prior art techniques have reported 2-3% level of degradation of Hamming distance over time. High randomness and uniqueness of PUF value (close to ideal Hamming distances) was observed.

The previously described embodiments use anti-fuse devices to generate the PUF, but the embodiments are not necessarily limited to anti-fuse devices. Other memory storage devices such as fuses can be used. Any memory device in which exposure to voltages and current over time is required to successfully program it, and a conduction path is formed in the cell between a wordline and a bitline electrically coupled to the cell as a result of the programming, are suitable for use in the present embodiments. While wordlines and bitlines are memory context-specific terms, other semiconductor structures having a similar function as wordlines and bitlines can be used. Different current limiting circuits may be developed to determine when a first cell of a pairing of cells has been successfully programmed. Such circuits can be developed based on the type of cell being used and knowledge of the cell behavior when programmed versus unprogrammed.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A Physical Unclonable Function (PUF) value generation system, comprising:
    a pair of dielectric breakdown-based anti-fuse memory cells each having first terminals electrically coupled to each other for receiving a first voltage and second terminals electrically coupled to each other for receiving a second voltage to enable programming of a random one of the pair of anti-fuse memory cells; and
    a current limiting circuit configured to couple the first voltage to the first terminals while the second terminals are coupled to the second voltage during a programming operation, the current limiting circuit being configured to provide a voltage difference between the first voltage and the first terminals after a first anti-fuse memory cell of the pair of anti-fuse memory cells forms a conductive link during the programming operation, the conductive link conducting current from the current limiting circuit to the second terminals, wherein the voltage difference inhibits programming of a second anti-fuse memory cell of the pair of anti-fuse memory cells.

2. The PUF value generation system of claim 1, wherein the first terminals are gate terminals of the anti-fuse memory cells, and the second terminals are diffusion contacts of the anti-fuse memory cells electrically coupled to each other.

3. The PUF value generation system of claim 2, wherein, the first voltage is a programming voltage and the second voltage is VSS.

4. The PUF value generation system of claim 3, wherein the current limiting circuit includes a transistor of a wordline driver circuit that couples the programming voltage to the gate terminals, and the voltage difference is a voltage drop of the gate terminals relative to the programming voltage.

5. The PUF value generation system of claim 4, wherein the current limiting circuit further includes a voltage generator for providing the programming voltage.

6. The PUF value generation system of claim 3, wherein the current limiting circuit includes a voltage generator for providing the programming voltage to the gate terminals.

7. The PUF value generation system of claim 3, wherein the current limiting circuit includes a transistor of a write driver circuit that couples VSS to the diffusion contacts, and the voltage difference is a voltage drop of the diffusion contacts relative to VSS.

8. The PUF value generation system of claim 3, wherein the gate terminals are connected in parallel to a wordline driven by a wordline driver circuit, and the diffusion contacts are connected to respective bitlines.

9. The PUF value generation system of claim 8, wherein column access circuitry is configured to selectively couple the bitlines to each other and to the current limiting circuit.

10. The PUF value generation system of claim 8, wherein the current limiting circuit includes the wordline driver circuit.

11. The PUF value generation system of claim 3, wherein the gate terminals of the first anti-fuse memory cell and the second anti-fuse memory cell are connected to different wordline driver circuits activated at the same time, and the diffusion contacts are connected to a common bitline.

12. The PUF value generation system of claim 11, wherein column access circuitry is configured to selectively couple the common bitline to the current limiting circuit.

13. A method of Physical Unclonable Function (PUF) value generation, comprising:
applying a first voltage to first terminals of a pair of anti-fuse memory cells that are electrically coupled to each other;
applying a second voltage to second terminals of the pair of anti-fuse memory cells that are electrically coupled to each other, the first voltage and the second voltage being effective for programming an anti-fuse memory cell;
forming a conductive link in a first anti-fuse memory cell of the pair of anti-fuse memory cells in response to the first voltage and the second voltage, to conduct current from the first terminals to the second terminals; and
changing a voltage level of the first terminals in response to the current conducted from the first terminals to the second terminals, that is effective for inhibiting programming a second anti-fuse memory cell of the pair of anti-fuse memory cells.

14. The method of claim 13, wherein changing the voltage level includes limiting current between the first voltage and the first terminals.

15. The method of claim 14, wherein limiting current includes providing a voltage drop of the first terminals relative to the first voltage.

16. The method of claim 15, wherein applying the first voltage includes driving a wordline connected to the first terminals with the first voltage with a wordline driver, and a transistor of the wordline driver provides the voltage drop of the wordline relative to the first voltage.

17. The method of claim 16, wherein applying the second voltage includes selectively coupling bitlines connected to the second terminals to the second voltage.

18. The method of claim 14, wherein limiting current includes providing a voltage drop of the second voltage relative to the second terminals.

19. The method of claim 18, wherein applying the first voltage includes driving bitlines connected to the first terminals with the first voltage with a write driver, and a transistor of the write driver provides the voltage drop of the first voltage relative to the bitlines.

20. A Physical Unclonable Function (PUF) programming method, comprising:
executing a programming operation on a predetermined number of pairs of anti-fuse memory cells until one anti-fuse memory cell of each pair is detected to have at least a first read current;
reading one anti-fuse memory cell of each of the predetermined number of pairs of antifuse memory cells to obtain a PUF data word using a reference voltage selected for detecting the first read current; and
re-programming the PUF data word to obtain programmed anti-fuse memory cells having a second read current greater than the first read current.

* * * * *